United States Patent [19]

Cipolli et al.

[11] Patent Number: 5,331,030
[45] Date of Patent: Jul. 19, 1994

[54] SELF-EXTINGUISHING POLYMERIC COMPOSITIONS

[75] Inventors: Roberto Cipolli, Novara; Roberto Oriani; Gilberto Nucida, both of Milan; Enrico Masarati, Piacenza, all of Italy

[73] Assignee: Ministero Dell'Universita' E Della Ricerca Scientifica E Tecnologica, Rome, Italy

[21] Appl. No.: 983,977

[22] Filed: Dec. 1, 1992

[30] Foreign Application Priority Data

Dec. 4, 1991 [IT] Italy .................. MI91 A 003253

[51] Int. Cl.$^5$ .................. C08K 5/3492; C08K 5/3435
[52] U.S. Cl. ..................... 524/100; 524/97; 524/415; 524/416
[58] Field of Search .................. 524/97, 100, 415, 416

[56] References Cited

U.S. PATENT DOCUMENTS

| | | | |
|---|---|---|---|
| 4,201,705 | 5/1980 | Halpern et al. | 524/100 |
| 4,504,610 | 3/1985 | Fontanelli et al. | 524/96 |
| 4,727,102 | 2/1988 | Scarso | 524/100 |
| 5,124,379 | 6/1992 | Cipolli et al. | 524/100 |
| 5,153,245 | 10/1992 | Cipolli et al. | 524/100 |
| 5,182,321 | 1/1993 | Bertelli et al. | 524/100 |
| 5,210,120 | 5/1993 | Cipolli et al. | 524/100 |

FOREIGN PATENT DOCUMENTS

| | | |
|---|---|---|
| 0014463 | 8/1980 | European Pat. Off. . |
| 0400600 | 12/1990 | European Pat. Off. . |
| 0406810 | 1/1991 | European Pat. Off. . |

*Primary Examiner*—Kriellion S. Morgan
*Attorney, Agent, or Firm*—Oblon, Spivak, McClelland, Maier & Neustadt

[57] ABSTRACT

Polymeric compositions with good flame self-extinguishing characteristics, based on thermoplastic polymers or polymers with elastomeric properties, especially olefinic polymers or copolymers, comprising:
   a) from 90 to 40 parts by weight of a thermoplastic polymer or a polymer with elastomeric properties;
   b) from 6 to 33 parts by weight of one or more ammonium or amine phosphates and/or phosphonates;
   c) from 4 to 27 parts by weight of one or more salts of 2,4,6-triamino-1,3,5-triazine derivatives with cyanuric acid, of general formula (I):

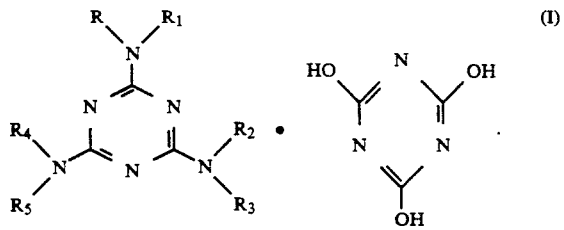

11 Claims, No Drawings

SELF-EXTINGUISHING POLYMERIC COMPOSITIONS

This invention relates to self-extinguishing polymeric compositions based on thermoplastic polymers or polymers with elastomeric properties, especially olefinic polymers or copolymers, containing salts of triazine compounds in combination with ammonium or amine Various methods are known in the art for reducing or eliminating polymer combustibility. Some of these known methods are based on the use of metal compounds, especially of antimony, bismuth or arsenic, in combination with partly halogenated thermally unstable organic compounds such as chlorinated paraffinic waxes. Other methods are based on the use of substances able to produce intumescence. Intumescence formulations generally consist of the polymer and at least three main additives, of which one is essentially phosphorated, its purpose being to form during combustion an impermeable semi-solid vitreous layer consisting essentially of polyphosphoric acid, and to activate the intumescence formation process, a second contains nitrogen for foaming purposes and the third contains carbon acting as a carbon donor for forming an insulating cellular layer (char) between the polymer and the flame.

Examples of intumescent formulations of this type are those described in the following patents: U.S. Pat. No. 3,810,862 (Phillips Petroleum Co.) based on melamine, pentaerythritol and ammonium polyphosphate, U.S. Pat. No. 4,727,102 (Vamp S.r.l.) based on melamine cyanurate, a hydroxyalkyl derivative of isocyanuric acid and ammonium polyphosphate, and published patent application WO 85/05626 (Plascoat U.K. Limited) based on various phosphorus and nitrogen compounds, and in particular a combination of melamine phosphate, pentaerythritol and ammonium polyphosphate.

In more recent formulations, in addition to the use of an organic or inorganic phosphorus compound, a nitrogen-containing organic compound is used, generally an aminoplastic resin obtained by condensing urea, melamine or dicyandiamide with formaldehyde. Examples of formulations comprising two additives are described in U.S. Pat. No. 4,504,610 (Montedison S.p.A.) based on oligomer derivatives of 1,3,5-triazine and ammonium polyphosphate, and European patent 14,463 (Montedison S.p.A.) based on organic compounds chosen from benzylguanamine and products of the reaction between aldehydes and various nitrogenated cyclic compounds, in particular benzylguanamine-formaldehyde copolymers, plus ammonium polyphosphate.

Self-extinguishing compositions can also be obtained by using single component additives containing both nitrogen and phosphorus in the organic molecule, as described in U.S. Pat. No. 4,201,705 (Borg-Warner Corp.).

These intumescence retarding systems give the polymer containing them the property of forming a carbon residue following fire or the application of a flame. Retarding systems of this type have numerous advantages, including the absence of corrosion in the machines used to work the polymers, lower smoke emission than systems containing metal compounds and halogenated hydrocarbons, and in particular the possibility of achieving satisfactory flame retardant properties in the polymer with a smaller total quantity of additive and hence without excessive fall-off in the polymer mechanical properties.

The Applicant has now found that polymers can be given considerable flame retardant properties by using a new class of nitrogen compounds of simple structure obtained by salifying with cyanuric acid derivatives of 2,4,6-triamino-1,3,5-triazine modified with a suitable substituent chosen from those described hereinafter.

As stated, it is known in the art (U.S. Pat. No. 4,727,102) the use of 2,4,6-triamino-1,3,5-triazine (melamine) cyanurate as coadditive for intumescent formulations in various polymer matrices, especially polyolefins. To exhibit its action as a flame retardant agent, this compound requires not only the phosphorated additive but also the component containing the carbon necessary to form the insulating carbon layer (char).

In contrast, the Applicant has now found that the saline compounds of the present invention, in conjunction with only the phosphorated component, enable intumescent polymer compositions to be obtained characterized by good thermal stability both towards thermal oxidation and during the transformation stage, so enabling them to be worked at a higher temperature than in the known art. As stated in published European patent application No. 406,810 in the name of the present Applicant, when in combination with ammonium or amine phosphates and/or phosphonates, those 2,4,6-triamino-1,3,5-triazine derivatives, the cyanurates of which are included within the self-extinguishing polymer compositions according to the present invention, confer excellent self-extinguishing characteristics on polymers which contain them.

However these additives have poor thermal stability, expressed as weight loss with increasing temperature (T.G.A.).

The Applicant has now found that the use of said cyanurates enables polymer compositions to be obtained having the same level of self-extinguishability, but with improved thermal stability in that the new additives exhibit excellent stability towards heating.

They therefore maintain excellent flame retardant activity even following hot-working of the polymeric compositions which contain them.

The salification reaction with cyanuric acid also makes the resultant salts completely insoluble in water, in contrast to the triazine derivatives from which they are prepared.

The polymeric compositions of the present invention also have the advantage of producing only very moderate, non obscuring smoke emission in the case of a fire.

More specifically, the compositions of the present invention comprise:

a) from 90 to 40 parts by weight of a thermoplastic polymer or a polymer with elastomeric properties; b) from 6 to 33, preferably from 8 to 30, parts by weight of one or more ammonium or amine phosphates and/or phosphonates;

c) from 4 to 27, preferably from 5 to 20, parts by weight of one or more salts of 2,4,6-triamino-1,3,5-triazine derivatives with cyanuric acid, of general formula (I):

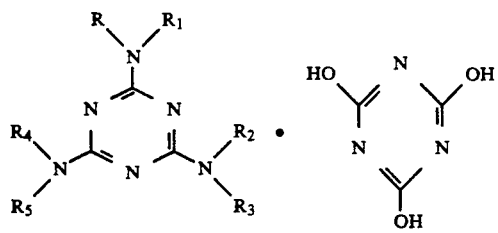 (I)

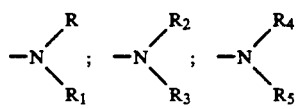

where: at least one of the radicals from R to $R_5$ is:

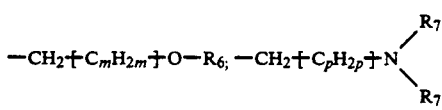

in which:

m is a whole number between 1 and 7, preferably between 1 and 3;

p is a whole number between 1 and 5;

$R_6$ is H; $C_1$–$C_8$ alkyl, preferably H or $C_1$–$C_4$ alkyl; $C_2$–$C_6$ alkenyl;

$-(C_qH_{2q})-O-R_8$ where q is a whole number between 1 and 4 and $R_8$ is H or $C_1$–$C_4$ alkyl; $C_6$–$C_{12}$ cycloalkyl or alkylcycloalkyl;

the radicals $R_7$, which can be the same or different, are: H; $C_1$–$C_8$ alkyl; $C_2$–$C_6$ alkenyl; $C_6$–$C_{12}$ cycloalkyl or alkylcycloalkyl; $C_1$–$C_4$ hydroxyalkyl; or the group:

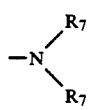

is replaced by a heterocyclic radical bound to the alkyl chain by the nitrogen atom and possibly containing a further heteroatom chosen preferably from O, S and N;

or in general formula (I) at least one of the groups:

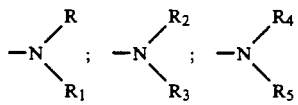

is replaced by a heterocyclic radical bound to the triazine ring by the nitrogen atom and possibly containing a further heteroatom chosen preferably from O, S and N.

The other radicals from R to $R_5$, which can be the same or different, have the aforesaid meaning or are: H; $C_1$–$C_{18}$ alkyl; $C_2$–$C_8$ alkenyl; $C_6$–$C_{16}$ cycloalkyl or alkylcycloalkyl, possibly substituted with a hydroxyl or $C_1$–$C_4$ hydroxyalkyl function. Examples of radicals from R to $R_5$ in general formula (I) are: methyl: ethyl: propyl; isopropyl; n-butyl; isobutyl; tert-butyl; n-pentyl; isopentyl; n-hexyl; tert-hexyl; octyl tert-octyl; decyl; dodecyl; octadecyl; ethenyl; propenyl; butenyl; isobutenyl; hexenyl; octenyl; cyclohexyl; propylcyclohexyl; butylcyclohexyl; decylcyclohexyl; hydroxycyclohexyl; hydroxyethylcyclohexyl; 2-hydroxyethyl; 2-hydroxypropyl; 3-hydroxypropyl; 3-hydroxybutyl; 4-hydroxybutyl; 3-hydroxypentyl; 5-hydroxypentyl; 6-hydroxyethyl; 3-hydroxy-2,5-dimethylhexyl; 7-hydroxyheptyl; 7-hydroxyoctyl; 2-methoxyethyl; 2-methoxypropyl; 3-methoxypropyl; 4-methoxybutyl; 6-methoxyethyl; 7-methoxyheptyl; 7-methoxyoctyl; 2-ethoxyethyl; 3-ethoxypropyl; 4-ethoxybutyl: 3-propoxypropyl; 3-butoxypropyl; 4-butoxybutyl; 4-isobutoxybutyl; 5-propoxypentyl; 2-cyclohexyloxyethyl; 2-ethenyloxyethyl; 2-(N,N-dimethylamino)ethyl; 3-((N,N-dimethylamino)propyl; 4-(N,N-dimethylamino)butyl; 5-(N,N-dimethylamino)pentyl; 4-(N,N-diethylamino)butyl; 5-(N,N-diethylamino)pentyl; 5-(N,N-diisopropylamino)pentyl; 3-(N-ethylamino)propyl; 4-(N-methylamino)butyl; 4-(N,N-dipropylamino)butyl; 2-(N,N-diisopropylamino)ethyl; 6-(N-hexenylamino)hexyl; 2-(N-ethenylamino)ethyl; 2-(N-cyclohexylamino)ethyl; 2-(N-2-hydroxyethylamino)ethyl; 2-(2-hydroxyethoxy)ethyl; 2-(2-methoxyethoxy)ethyl; 6-(N-propylamino)hexyl; and so forth.

Examples of heterocyclic radicals which can replace the groups:

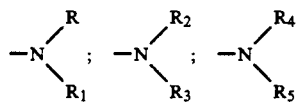

in general formula (I) are: aziridine; pyrrolidine: piperidine: morpholine; thiomorpholine; piperazine: 4-methylpiperazine; 4-ethylpiperazine; 2-methylpiperazine: 2,5-dimethylpiperazine; 2,3,5,6-tetramethylpiperazine; 2,2,5,5-tetramethylpiperazine; 2-ethylpiperazine; 2,5-diethylpiperazine; and so forth.

Examples of heterocyclic radicals which can replace the group:

are: aziridine; pyrrolidine; piperidine; morpholine; thiomorpholine; piperazine; 4-methylpiperazine 4-ethylpiperazine; and so forth. Particularly preferred are the compounds of general formula (I) in which one or two of the groups:

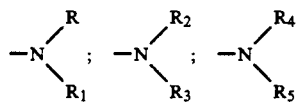

are each an $-NH_2$ group.

Specific compounds included in formula (I) are given in the examples which follow this description.

The saline products of general formula (I) can be synthesized by reacting one mole of the 2,4,6-triamino-1,3,5-triazine derivative of general formula (II):

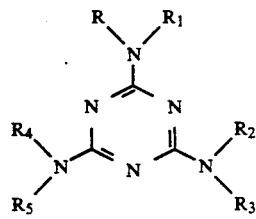 (II)

where the substituents from R to $R_5$ have the aforedefined meaning, with one mole of cyanuric acid in the presence of a suitable solvent (such as water, methyl alcohol, ethyl alcohol, acetonitrile, and so forth) at a temperature between 0° C. and the boiling point of the solvent used.

The saline product formed can be easily separated from the reaction mass by filtration or by distilling the solvent. Generally, good quality products of general formula (I) are obtained in the form of a white crystalline powder usable in a self-extinguishing polymeric compositions without further purification.

Many of the intermediates of general formula (II) are known, and can be easily synthesized by the general method shown schematically below:

composition. A further polyphosphate which can be advantageously used, in particular because of its low water solubility, is that known by the commercial name of "Exolit 462" (produced and marketed by the Hoechst Co.) and corresponding to Exolit 422 microencapsulated in melamine-formaldehyde resin.

Other usable phosphates are those deriving from amines, such as dimethylammonium or diethylammonium phosphate, ethylenediamine phosphate, or melamine ortho or pyrophosphate.

Among phosphonates, excellent results have been obtained using the ammonium phosphonates (mono or

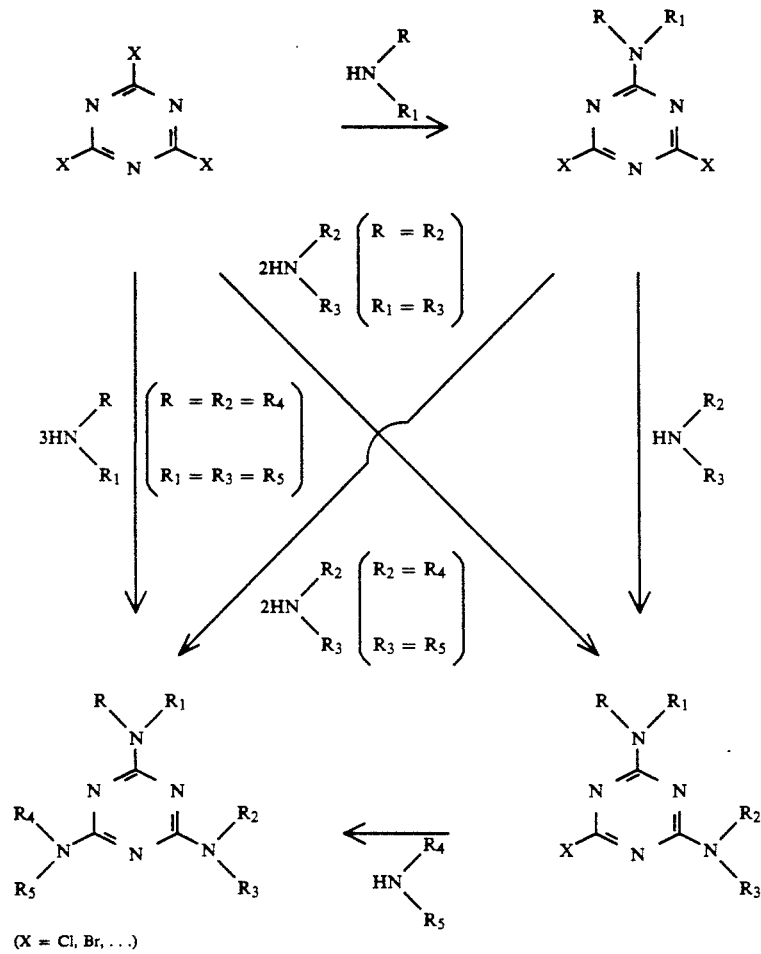

(X = Cl, Br, ...)

or as described in the published European patent application No. 406,810 in the name of the present applicant.

The preferred phosphates are those ammonium polyphosphates of general formula $(NH_4)_{n+2}P_nO_{3n+1}$ in which n is a whole number equal to or greater than 2. Preferably the molecular weight of the polyphosphates is sufficiently high to ensure low water solubility. Indicatively, n varies preferably from 2 to 500. The composition of the polyphosphates of the aforesaid formula, in which n is a sufficiently large number preferably between 50 and 500, is practically that which corresponds to the metaphosphate formula $(NH_4PO_3)_n$.

An example of these polyphosphates is that known by the commercial name of "Exolit 422" (produced and marketed by the Hoechst Co.) and having the composition $(NH_4PO_3)_n$ in which n is greater than 50. A further example is the product known by the name "Phos-Chek P/40" (Monsanto Chemicals) and having an analogous poly substituted) deriving from mono or polyphosphonic acids, examples of which are: ethane-1,1,2-triphosphonic acid; 2-hydroxyethane-1,1,2-triphosphonic acid; propane-1,2,3-triphosphonic acid: methylphosphonic acid: ethylphosphonic acid; n-propylphosphonic acid: n-butylphosphonic acid; phenylphosphonic acid; 1-aminoethane-1,1-diphosphonic acid; 1-hydroxyethane-1,1-diphosphonic acid; 1-hydroxydodecane-1,1-diphosphonic acid; phosphonoacetic acid; 2-phosphonopropionic acid; 3-phosphonopropionic acid; 2-phosphonobutyric acid; 4-phosphonobutyric acid; aminotris(methylenephosphonic) acid; ethylenediaminetetra(methylenephosphonic) acid; hexamethylenediaminetetra(methylenephosphonic) acid; diethylenetriaminepenta(methylenephosphonic) acid; and so forth.

The preferred polymers usable in the compositions of the present invention are the polymers or copolymers of olefins of general formula R—CH=CH$_2$ where R is a hydrogen atom or a C$_1$–C$_8$ alkyl or aryl radical, and in particular:

1. isotactic or prevalently isotactic polypropylene;
2. HDPE, LLDPE or LDPE polyethylene;
3. crystalline copolymers of propylene with minor proportions of ethylene and/or other alpha-olefins, such as 1-butene, 1-hexene, 1-octene, or 4-methyl-1-pentene;
4. heterophasic compositions comprising A) a propylene homopolymeric fraction, or one of the copolymers of point 3, and B) a copolymeric fraction formed from elastomeric copolymers of ethylene with an alphaolefin, possibly containing minor proportions of a diene, the alpha-olefin being preferably chosen from propylene and 1-butene
5. elastomeric copolymers of ethylene with alpha-olefins possibly containing minor proportions of a diene.

Examples of dienes most commonly present in said elastomeric copolymers are butadiene, ethylidene-norbonene and 1,4-hexadiene. The preferred polymers of olefins of formula R-CH=CH$_2$ in which R is an aryl radical are high-impact and "crystal" polystyrene.

Other examples of commonly used polymers are acrylonitrile/butadiene/styrene (ABS) and styrene/acrylonitrile (SAN) copolymers, polyurethane (polyester and polyether); polyethyleneterephthalate; polybutyleneterephthalate polyamides; and so forth.

The self-extinguishing compositions of the present invention can be prepared by known methods, for example by firstly intimately mixing the ammonium or amine phosphate and/or phosphonate with one or more salts of general formula (I) in finely ground form (preferably with particles less than 70 μm), then adding the mixture obtained to the polymer in a turbomixer to form a homogeneous mixture, which is extruded and granulated. The granulated product obtained in this manner can be transformed into various articles by any of the known moulding methods. The flame-retardant additives can also be used in fire-retardant paints.

Saline compounds included in general formula (I) which are not cited in the examples but are equally advantageously usable in the self-extinguishing polymeric compositions of the present invention are shown in Table 1.

TABLE 1

| Compound No. | R—N—R$_1$ | | R$_2$—N—R$_3$ | | R$_4$—N—R$_5$ | |
|---|---|---|---|---|---|---|
| 1 | (CH$_2$)$_2$OCH=CH$_2$ | H | H | H | H | H |
| 2 | N(CH$_2$CH$_2$)$_2$N—CH$_3$ | | CH$_2$CH$_2$OCH$_3$ | H | H | H |
| 3 | CH$_2$CH$_2$CH$_2$N(CH$_2$CH$_2$)$_2$O | H | H | H | H | H |
| 4 | N(CH$_2$CH$_2$)$_2$O | | t-C$_4$H$_9$ | H | H | H |
| 5 | (CH$_2$)$_2$O(CH$_2$)$_2$OH | H | (CH$_2$)$_2$O(CH$_2$)$_2$OH | H | H | H |
| 6 | CH$_2$CH$_2$OH—C$_6$H$_{11}$ | | H | H | H | H |
| 7 | N(CH$_2$CH$_2$)$_2$S | | CH$_2$CH$_2$OH | H | H | H |
| 8 | CH$_2$CH$_2$OH CH$_2$CH$_2$OH | | H | H | H | H |
| 9 | N(CH$_2$CH$_2$)$_2$O | | t-C$_8$H$_{17}$ | H | H | H |
| 10 | (CH$_2$)$_5$OH | H | H | H | H | H |
| 11 | N(CH$_2$CH$_2$)$_2$N—CH$_3$ | | H | H | H | H |

TABLE 1-continued

| Compound No. | R—N—R₁ | | R₂—N—R₃ | | R₄—N—R₅ | |
|---|---|---|---|---|---|---|
| 12 | ⌐N⌐ (piperidine) | H | H | H | H | H |
| 13 | (CH₂)₄OCH₃ | H | H | H | H | H |
| 14 | CH₂CHOH–CH₃ | H | CH₂CHOH–CH₃ | H | H | H |
| 15 | (CH₂)₃N(C₂H₅)₂ | H | H | H | H | H |
| 16 | (CH₂)₂OCH=CH₂ | CH₃ | H | H | H | H |
| 17 | CH₂CH₂OH | H | CH₂CH₂OH | H | CH₂CH₂OH | H |
| 18 | ⌐N⌐ (pyrrolidine) | H | H | H | H | H |
| 19 | (CH₂)₃OC₂H₅ | H | H | H | H | H |
| 20 | CH₂CH₂OH | CH₃ | CH₂CH₂OH | CH₃ | H | H |
| 21 | (CH₂)₃OCH₃ | H | (CH₂)₃OCH₃ | H | (CH₂)₃OCH₃ | H |
| 22 | ⌐N  O⌐ (morpholine) | | CH₂CH₂OCH₃ | H | CH₂CH₂OCH₃ | H |

The following examples illustrate but do not limit the characteristics of the invention.

The salification reactions between the intermediates of general formula (II) and the cyanuric acid are confirmed by IR spectroscopic analysis on a Perkin Elmer 580B grid spectrophotometer.

It was found that the band relative to deformation outside the plane of the triazine ring formed an excellent reference signal. This lies at about 830–800 cm⁻¹ for the undisturbed ring, whereas it lies at 795–760 cm⁻ for the ring salified on amino groups.

EXAMPLE 1

184.5 g of cyanuric chloride and 800 cm³ of acetone are fed into a 3 liter reactor fitted with a stirrer, thermometer, dropping funnel, reflux condenser and heating bath.

The mixture is heated to 40° C. and stirred until a solution is obtained, after which 284 g of a 30 wt % aqueous ammonia solution are added over a period of 1 hour 30 minutes while maintaining the temperature at 40° C. The solution is then heated to 45° C. and maintained at this temperature for 4 hours.

After cooling, the product which forms is filtered off and washed with water on the filter.

After drying in an oven at 50°–60° C. under vacuum, 113 g of the intermediate (III):

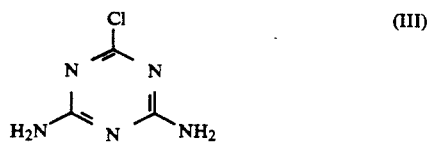

(III)

are obtained in the form of a infusible white crystalline powder with a chlorine content of 24.12% (theoretical = 24.361%). 101.9 g of the intermediate (III), 500 cm³ of water and, under agitation, 44.8 g of 2-hydroxyethylamine are fed into a 1 liter reactor fitted with a Stirrer, thermometer, dropping funnel, reflux condenser and heating bath.

The mixture is heated to boiling and maintained under reflux for 4 hours.

It is then further left under reflux for 8 hours while adding 28 g of sodium hydroxide dissolved in 90 cm³ of water in such portions as to maintain the pH between 7 and 8.

It is cooled to 15° C. and the product which forms is filtered off, then washed on the filter with cold water.

On drying the filter cake in an oven at 100° C. 107.5 g of 2-(2-hydroxyethyl)amino-4,6-diamino-1,3,5-triazine (IV):

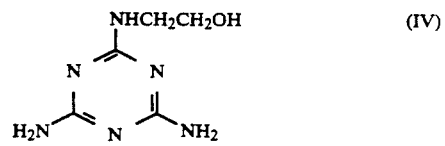

(IV)

are obtained in the form of a white crystalline powder with m.p.=225°–230° C. ( m.p.=melting point).

The structure of the intermediates (III) and (IV) was confirmed by IR spectroscopic analysis.

500 cm³ of water and, under agitation, 68.0 g of the intermediate (IV) and 51.6 g of cyanuric acid are fed into the same 1 liter reactor.

The mass is heated to boiling and maintained under reflux for 10 hours.

It is allowed to cool to room temperature and the product formed is filtered off and washed with water on the filter. On drying the filter cake in an oven at 100° C., 118.4 g of the product:

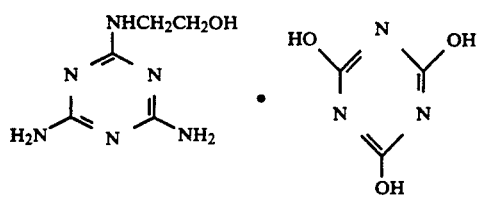

are obtained in the form of a white crystalline powder with m.p. exceeding 300° C.

EXAMPLE 2

600 cm³ of water and 92.2 R of cyanuric chloride are fed into a 2 liter reactor equipped as in Example 1 but initially provided with a cooling bath.

After cooling to 2° C. from the outside, 75.0 g of 2-methoxyethylamine in 100 cm³ of water are fed in over a time of 2 hours. During the addition the temperature is allowed to rise gradually to 5°-7° C.

The temperature is raised to 20° C. and maintained at this value for 1 hour, after which it is raised to 35°-40° C., and 40 g of sodium hydroxide dissolved in 100 cm³ of water are added ever about 3 hours.

The reaction mass is heated to 60° C. and this temperature maintained for 2 hours.

It is cooled to room temperature and the product which forms is filtered off and washed on the filter with water.

On drying the filter cake in an oven at 100° C. 120.4 g of the intermediate (V);

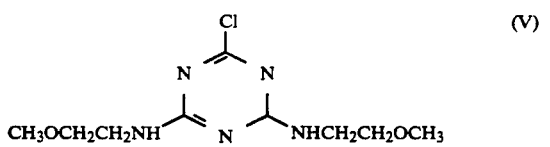

are obtained in the form of a white crystalline powder with m.p.=162°-164° C. with a chlorine content of 13.48% (theoretical = 13.57%). 600 cm³ of water, 78.5 g of the intermediate (V) and 22.5 g of 2-methoxyethylamine are fed into the same 2 liter reactor.

The mass is heated to boiling and maintained under reflux for 2 hours, after which 12 g of sodium hydroxide dissolved in 50 cm³ of water are added over about 3 hours.

Boiling is maintained for a further 2 hours, after which it is cooled to room temperature.

The aqueous solution is treated with three 300 cm³ portions of methylene chloride.

The organic extracts are pooled, dried and distilled. 86.7 g of 2,4,6-tris(2-methoxyethyl)amino-1,3,5-triazine (VI):

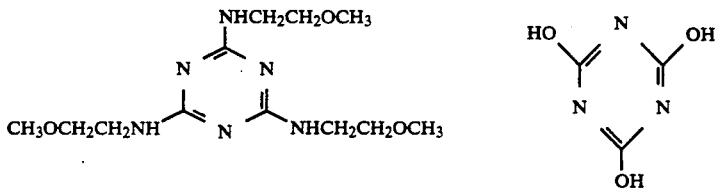

are obtained in the form of a very dense liquid product ( m.p. =13° C.).

The structure of the intermediates (V) and (VI) was confirmed by NMR analysis.

400 cm³ of water and, under agitation. 64.4 g of the intermediate (VI) and 19.4 R of cyanuric acid are fed into the same 1 liter apparatus.

The mass is heated to boiling and maintained under reflux for 4 hours.

It is allowed to cool to room temperature and the product formed is filtered off and washed with water on the filter. On drying the filter cake in an oven at 100° C., 83.2 g of the product:

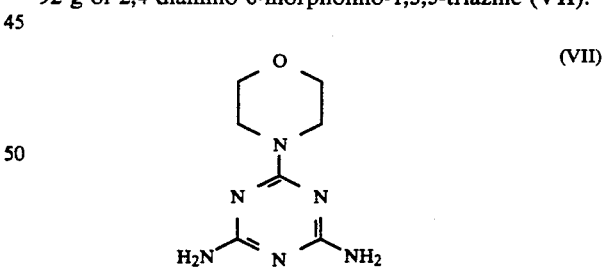

are obtained in the form of a white crystalline powder with its m.p. exceeding 300° C.

EXAMPLE 3

91 of the intermediate (III), 240 cm³ of toluene and 110 g of morpholine are fed into the 1 liter apparatus described in Example 1.

The mixture is heated to 65°-70°C. and maintained at this temperature for 2 hours. It is then heated to boiling and maintained under reflux for 1 hour.

It is left to cool to room temperature, after which the product is removed by filtration. The filter cake is washed abundantly with water to obtain, after drying, 92 g of 2,4-diamino-6-morpholino-1,3,5-triazine (VII):

in the form of a white crystalline powder with m.p.=248°-250° C.

The structure of the intermediate (VII) was confirmed by IR spectroscopic analysis.

300 cm³ of water and, under agitation, 39.2 g of the intermediate (VII) and 25.9 g of cyanuric acid are fed into a 0.5 liter reactor equipped as in Example 1.

The mass is heated to boiling and maintained under reflux for 14 hours.

It is then cooled to room temperature and the product formed is filtered off and washed with water.

On drying the filter cake in an oven at 100° C., 64.5 g of the product:

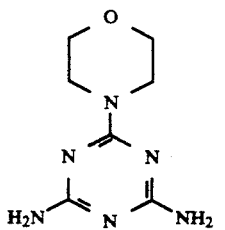 · 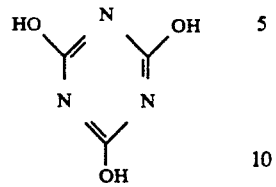

are obtained in the form of a white crystalline powder with m.p. exceeding 300° C.

EXAMPLE 4

136 g of the intermediate (III) and 800 cm³ of xylene are fed into the 3 liter apparatus of Example 1.

The suspension is heated to 120° C. and 302 g of the ethyl ester of N-piperazinecarboxylic acid are added over 1 hour.

The mixture is maintained at 125°–130° C. for 2 hours, after which it is cooled to room temperature and the formed product is filtered off, the filter cake being washed firstly with xylene and then abundantly with water.

After drying in an oven at 100° C., 230 g of the intermediate (VIII):

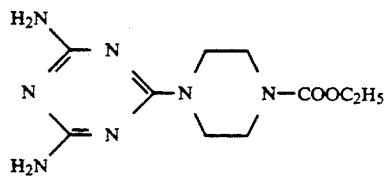 (VIII)

are obtained as a white crystalline powder with m.p.=210°–215° C. The structure of the intermediate (VIII) was confirmed by NMR analysis.

1000 cm³ of acetic acid. 620 g of a 33 wt % acetic solution of hydrobromic acid and 120 g of the intermediate (VIII) are fed into the same apparatus.

The mixture is heated to 95°C. and maintained under agitation at this temperature for 6 hours.

It is then cooled to room temperature and the formed product is filtered off and washed on the filter with acetic acid.

The squeezed filter cake is taken up in a 2 liter beaker with 500 cm³ of water, and a 50 wt % aqueous sodium hydroxide solution added under agitation until pH 11 is attained.

The mixture is left under agitation for a further 1 hour, after which the formed product is filtered off and washed abundantly on the filter with water.

On drying in an oven at 100° C., 60 g of 2,4-diamino-6-piperazino1,3,5-triazine

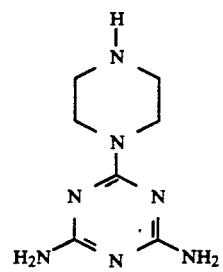 (IX)

are obtained in the form of a white crystalline powder with m.p.=262°–268° C.

The structure of the intermediate (IX) was confirmed by IR spectroscopic analysis.

450 cm³ of water and, under agitation, 48.8 g of the intermediate (IX) and 32.3 g of cyanuric acid are fed into the 1 liter apparatus of Example 1.

The mass is heated to boiling and maintained under reflux for 8 hours.

It is then allowed to cool to room temperature and the product formed is filtered off and washed with water.

On drying the filter cake in an oven at 100° C., 78.6 g of the product:

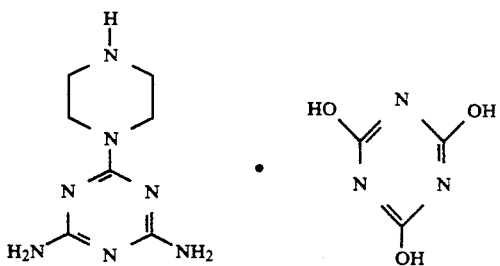

are obtained in the form of a white crystalline powder with m.p. Exceeding 300° C.

EXAMPLE 5

184.5 g of cyanuric chloride and 1300 cm³ of methylene chloride are fed into the 3 liter apparatus described in Example 1 but provided initially with a cooling bath.

After cooling from the outside, 87.2 g of morpholine and 40 g of sodium hydroxide dissolved in 150 cm³ of water are fed in simultaneously over 3 hours while maintaining the pH between 5 and 7 and the temperature between 0° and 3° C.

The temperature is maintained at 0°–3° C. for a further 3 hours, after which the aqueous phase is separated.

By distilling the methylene chloride 230 g of the intermediate (X):

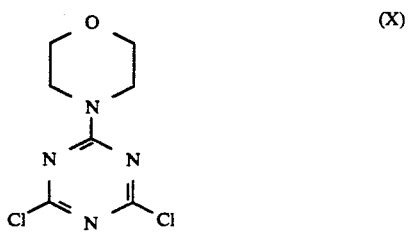 (X)

are obtained in the form of a white crystalline powder with m.p.: 155°–157° C. at a purity exceeding 98% (determined by gas chromatography) and with a chlorine content of 29.87% (theoretical 30.21%).

100 g of a 30 wt % ammonia solution, 100 cm³ of water and 70.5 g of the intermediate (X) are fed into a 0.5 liter reactor equipped as in Example 1.

The mixture is heated to 50° C. and maintained for 7 hours at this temperature. It is allowed to cool to room temperature, the product obtained is filtered off and washed with water. On drying the filter cake, 58 g of the intermediate (XI):

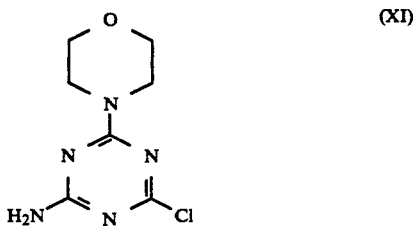

are obtained in the form of a white crystalline powder with m.p.=189°-191° C., with a chlorine content of 16.28% (theoretical 16.47%). 58 g of the intermediate (XI) and 300 cm³ of water are fed into the same apparatus, followed, under agitation, by 18 g of 2-aminoethanol.

The mixture is heated to boiling and maintained under reflux for 3 hours.

It is then further left under reflux for 3 hours while adding 11.8 g of sodium hydroxide dissolved in 50 cm³ of water in such portions as to maintain the pH between 7 and 8.

The mass is cooled, the product filtered off and the filter cake washed with water.

On drying, 58 g of 2-amino-4-(2-hydroxyethyl)amino-6-morpholino-1,3,5-triazine (XII):

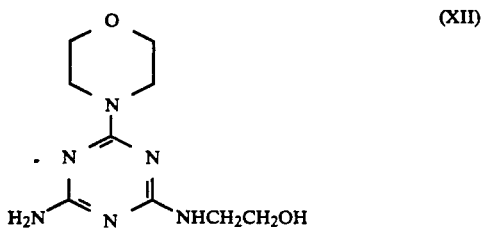

are obtained in the form of a white crystalline powder with m.p.=159°-161° C.

The structure of the intermediates (X), (XI) and (XIII) was confirmed by IR spectroscopic analysis. 450 cm³ of water and, under agitation, 48.0 g of the intermediate (XII) and 25.8 g of cyanuric acid are fed into the 1 liter apparatus of the preceding examples.

The mass is heated to boiling and maintained under reflux for 10 hours.

Proceeding as described in the preceding examples, 72.9 g of the product:

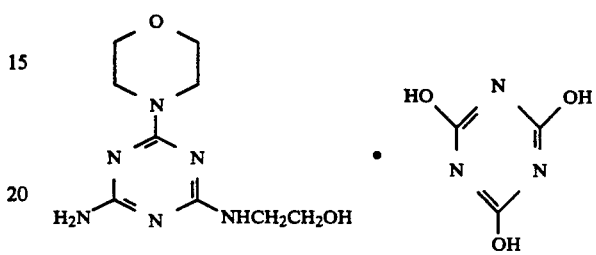

are obtained in the form of a white crystalline powder with m.p.=270°-274° C.

EXAMPLES 6-10

Operating under conditions analogous to those described in Examples from 1 to 5, the saline products of general formula (I) shown in Table 2 are prepared.

TABLE 2

| Example N° | R—N—R₁ | | R₂—N—R₃ | | R₄—N—R₅ | | m.p. (°C.) |
|---|---|---|---|---|---|---|---|
| 6 | N O (morpholino) | | CH₂—CH=CH₂ | H | H | H | 237-240 |
| 7 | CH₂CH₂OCH₃ | H | H | H | H | H | >300 |
| 8 | CH₂CH₂OCH₃ | CH₂CH₂OCH₃ | H | H | H | H | 258-262 |
| 9 | CH₂CH₂OH | H | CH₂CH₂OH | H | H | H | 290-295 |
| 10 | N S (thiomorpholino) | | H | H | H | H | >300 |

TABLE 3

Table 3 shows the results of thermogravimetric analysis (T.G.A.) of some of the salts of general formula (I) described in the examples of the present invention, compared with those of the corresponding 2,4,6-triamino-1,3,5-triazine derivatives of general formula (II).

The thermal stability of these products was determined by evaluating the weight lost on temperature increase. A DU PONT Model 951-9900 thermobalance was used, operating with an air rate of 5 liters/hour, a heating rate of 20° C./minute within the temperature range of 20°-600° C., and a product quantity of about 10 mg.

TABLE 3

| Weight loss (%) | Product Example 1 (I) | Product Example 1 (II) | Product Example 3 (I) | Product Example 3 (II) | Product Example 4 (I) | Product Example 4 (II) | Product Example 5 (I) | Product Example 5 (II) | Product Example 6 (I) | Product Example 6 (II) |
|---|---|---|---|---|---|---|---|---|---|---|
| 2  | 294 | 267 | 252 | 235 | 255 | 250 | 271 | 242 | 227 | 213 |
| 5  | 313 | 267 | 268 | 252 | 282 | 267 | 287 | 259 | 242 | 226 |
| 10 | 323 | 280 | 283 | 264 | 306 | 280 | 297 | 276 | 262 | 241 |
| 20 | 329 | 298 | 297 | 277 | 319 | 294 | 303 | 294 | 285 | 258 |
| 50 | 396 | 381 | 319 | 301 | 349 | 322 | 374 | 337 | 315 | 286 |

Temperature at which weight loss occurs (I) Salt of general formula (I)
(II) 2,4,6-triamino-1,3,5-triazine derivative of general formula (II)

Table 4 and 5

The tests indicated in Tables 4 and 5 relate to polymeric compositions containing the products of general formula (I) prepared as in the preceding examples.

Test pieces in the form of plates of about 3 mm thickness were prepared by moulding mixtures of granular polymer and additives in a MOORE plate press, operating for 7 minutes at a pressure of 40 kg/cm$^3$.

The level of self-extinguishing was determined on the plates obtained in this manner by measuring the oxygen index (L.O.I. in accordance with ASTM D-2863/77) in a Stanton Redcroft apparatus, and applying the "Vertical Burning Test" which makes it possible the material to be classified in three classes, namely 94 V-0, 94 V-1 and 94 V-2 in accordance win the UL 94 standards (published by the Underwriters Laboratories, USA).

Table 4 shows the values obtained using an isotactic polypropylene in flake form with a melt flow index of 12 and with 96 wt % insoluble in boiling n-heptane.

Table 5 shows the values obtained using a low density polyethylene in granular form with a melt flow index of 7; a polystyrene in granular form containing 5 wt % of butadiene rubber and with a melt flow index of 9; a polyester thermoplastic polyurethane (ESTANE 54600$^R$ by Goodrich) and polyether thermoplastic polyurethane (ESTANE 58300$^R$ by Goodrich) in granular form of density 1.19 and 1.10 g/cm$_3$ respectively; an ethylene-propylene elastomer copolymer containing 45 wt % of polypropylene: and an acrylonitrile-butadiene-styrene terpolymer with a density of 1.06 and a melt flow index of 1.6 and containing about 40% of acrylonitrile and styrene and 20% of butadiene,

TABLE 4

| Example N° | Product example No. | Parts by weight Product | PP[1] | AO[2] | APP[1] | L.O.I. (ASTM D2863) | UL 94 (3 mm) |
|---|---|---|---|---|---|---|---|
| 11 | 1  | 6,0  | 75 | 1 | 18,0    | 33,5 | VO |
| 12 | 2  | 6,0  | 75 | 1 | 18,0    | 31,1 | VO |
| 13 | 3  | 6,6  | 76 | 1 | 16,4    | 31,8 | VO |
| 14 | 4  | 8,0  | 75 | 1 | 16,0    | 32,1 | VO |
| 15 | 5  | 6,8  | 75 | 1 | 17,2    | 32,5 | VO |
| 16 | 6  | 7,4  | 73 | 1 | 18,6    | 32,5 | VO |
| 17 | 7  | 6,8  | 75 | 1 | 17,2    | 32,3 | VO |
| 18 | 8  | 8,0  | 75 | 1 | 16,0    | 33,2 | VO |
| 19 | 9  | 5,3  | 75 | 1 | 18,7    | 34,1 | VO |
| 20 | 10 | 14,5 | 70 | 1 | 14,5    | 36,6 | VO |
| 21 | 1  | 6,9  | 75 | 1 | 17,1(*) | 32,8 | VO |
| 22 | 5  | 7,2  | 76 | 1 | 15,8(*) | 31,7 | VO |
| 23 | 3  | 6,5  | 73 | 1 | 19,5[3] | 30,7 | VO |
| 24 | 4  | 7,1  | 74 | 1 | 17,9[4] | 31,6 | VO |

[1] PP = polypropylene
APP = ammonium polyphosphate - Exolit 422$^R$ (Hoechst)
(*) = APP microencapsulated with melamine-formaldehyde resin Exolit 462$^R$ (Hoechst)
[2] AO = antioxidant
Mixture consisting of 2 parts of dilaurylthiopropionate and 1 part of pentaerythritol tetra[3-(3,5-di-tert-butyl-4-hydroxyphenyl)propionate]
[3] APP replaced with the monoammonium salt of 1-amino-ethane-1,1-diphosphonic acid
[4] APP replaced with the monoammonium salt of 1-hydroxy-ethane-1,1-diphosphonic acid

TABLE 5

| Example N° | Polymeric support[1] | Product Example N° | Parts by weight Product | Polymer | AO[2] | APP[1] | L.O.I. (ASTM D2863) | UL 94 (3 mm) |
|---|---|---|---|---|---|---|---|---|
| 25 | LDPE     | 5  | 7,2 | 70 | 1 | 21,8 | 31,0 | VO |
| 26 |          | 8  | 8,3 | 66 | 1 | 24,7 | 30,2 | VO |
| 27 | HIPS     | 3  | 8,5 | 65 | 1 | 25,5 | 31,6 | VO |
| 28 |          | 5  | 9,5 | 66 | 1 | 23,5 | 30,8 | VO |
| 29 | PU       | 3  | 8,5 | 70 | 1 | 20,5 | 32,5 | VO |
| 30 | ester    | 10 | 7,3 | 70 | 1 | 21,7 | 33,1 | VO |
| 31 | PU ether | 10 | 8,3 | 70 | 1 | 20,7 | 29,4 | VO |
| 32 | PP/PE    | 3  | 8,2 | 70 | 1 | 20,8 | 32,9 | VO |
| 33 |          | 4  | 9,2 | 67 | 1 | 22,8 | 33,5 | VO |

TABLE 5-continued

| Example N° | Polymeric support[1] | Product Example N° | Parts by weight | | | | L.O.I. (ASTM D2863) | UL 94 (3 mm) |
|---|---|---|---|---|---|---|---|---|
| | | | Product | Polymer | AO[2] | APP[1] | | |
| 34 | ABS | 5 | 8,5 | 65 | 1 | 25,5 | 29,4 | VO |

[1]APP = ammonium polyphosphate - Exolit 422$^R$ (Hoechst)
LDPE = low density polyethylene
HIPS = polystyrene containing 5% of butadiene rubber
PU (ester) = polyurethane polyester
PU (ether) = polyurethane polyether
PP/PE = propylene-ethylene copolymer
ABS = acrylonitrile-butadiene-styrene terpolymer
[2]AO = antioxidant
Mixture consisting of 2 parts of dilaurylthiopropionate and 1 part of pentaerythritol tetra[3-(3,5-di-tert-butyl-4-hydroxyphenyl)propionate]

EXAMPLE 35 (comparison)

Operating in the manner of Examples from 11 to 24 but using 2,4,6-triamino-1,3,5-triazine cyanurate (melamine cyanurate as the nitrogen compound, the following composition is prepared:

| | |
|---|---|
| Polypropylene | 75 parts by weight |
| Antioxidant | 1 parts by weight |
| Ammonium polyphosphate | 17.1 parts by weight |
| Melamine cyanurate | 6.9 parts by weight |

Using this composition, test pieces were prepared and subjected to self-extinguishing tests in the aforedescribed manner. The following results were obtained: L. O. I.=22.4 UL 94 (3 mm): class B (the test piece burns)

We claim:

1. Self-extinguishing polymeric compositions comprising:
   a) from 90 to 40 parts by weight of a thermoplastic polymer or a polymer with elastomeric properties;
   b) from 6 to 33 parts by weight of one or more ammonium or amine phosphates, phosphonates or mixtures therein;
   c) from 4 to 27 parts by weight of one or more salts of 2,4,6-triamino-1,3,5-triazine derivatives with cyanuric acid, of formula (I):

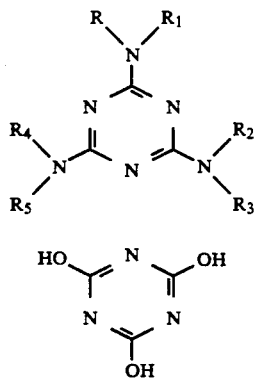

where:
at least one of the radicals from R to R$_5$ is:

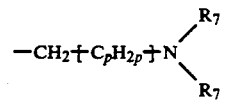

in which:
m is a whole number between 1 and 7:
p is a whole number between 1 and 5;
R$^6$ is H, C$_1$-C$_8$ alkyl, C$_2$-C$_6$ alkenyl, —[C$_q$H$_{2q}$]O—R$_8$ where q is a whole number between 1 and 4 and R$_8$ is H, C$_1$-C$_4$ alkyl; C$_6$-C$_{12}$ cycloalkyl or alkylcycloalkyl;
the radicals R$_7$, which can be the same or different, are: H, C$_1$-C$_8$ alkyl, C$_2$-C$_6$ alkenyl, C$_6$-C$_{12}$ cycloalkyl, alkylcycloalkyl, C$_1$-C$_4$ hydroxyalkyl, the group:

is replaced by a heterocyclic radical bound to the alkyl chain by the nitrogen atom, selected from the group consisting of aziridine, pyrrolidine, piperidine, morpholine, thiomorpholine, piperizine, 4-methylpiperazine, 4-ethylpiperazine,
or in formula (I) at least one member of the group

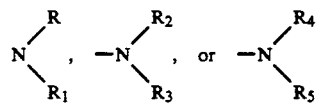

is replaced by a heterocyclic radical bound to the triazine ring by the nitrogen atom selected from the group consisting of aziridine, pyrrolidine, piperidine, morpholine, thiomorpholine, piperazine, 4-methylpiperazine, 4-ethylpiperazine, 2-methylpiperazine, 2,5-dimethylpiperazine, 2,3,5,6-tetramethylpiperazine, 2,2,5,5-tetramethylpiperazine, 2-ethylpiperazine, and 2,5-diethyl-piperazine, the other radicals from R to R$_5$, which can be the same or different, and have the aforesaid meanings;
or are members selected from the group consisting of H, C$_1$-C$_{18}$ alkyl, C$_2$-C$_8$ alkenyl, C$_6$-C$_{16}$ cycloalkyl, alkylcycloalkyl, or their hydroxyl or C$_1$-C$_4$ hydroxyalkyl derivatives.

2. Self-extinguishing polymeric compositions as claimed in claim 1, wherein at least one of the radicals from R to R$_5$ is replaced by a group:

in which:
m is a whole number between 1 and 3 and R$_6$ is hydrogen or C$_1$-C$_4$ alkyl.

3. Self-extinguishing polymeric compositions as claimed in claim 1 wherein one or two of the groups:

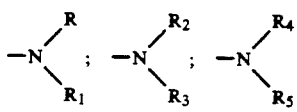

are each replaced by a —$NH_2$ group.

4. Self-extinguishing polymeric compositions as claimed in claim 1, wherein the ammonium phosphate or phosphates (b) are of the formula $(NH_4)_{n+2}P_nO_{3n+1}$ where n is a whole number equal to or greater than 2.

5. Self-extinguishing polymeric compositions as claimed in claim 1, wherein the ammonium phosphate or phosphates (b) are of general formula $(NH_4PO_3)_n$ where n is a whole number between 50 and 500.

6. Self-extinguishing polymeric compositions as claimed in claim 1, wherein the amine phosphate or phosphates (b) are chosen from dimethylammonium phosphate, diethylammonium phosphate, ethylenediamine phosphate, melamine orthophosphate and melamine pyrophosphate.

7. Self-extinguishing polymeric compositions as claimed in claim 1, wherein the ammonium phosphonate or phosphonates (b) are mono or polysubstituted and are chosen from salts of mono or polyphosphonic acids.

8. Self-extinguishing polymeric compositions as claimed claim 1, wherein the polymer (a) is chosen from polymers and copolymers of olefins of the formula R—CH=$CH_2$ where R is a hydrogen atom, a $C_1$-$C_8$ alkyl or aryl radical, acrylonitrile/butadiene/styrene (ABS) terpolymer, styrene/acrylonitrile (SAN) copolymers, polyurethane, polyethyleneterephthalate, polybutyleneterephthalate.

9. Self-extinguishing polymeric compositions as claimed in claim 8, wherein the olefinic polymers and copolymers are chosen from:
   1) isotactic or prevalently isotactic polypropylene;
   2) HDPE, LLDPE or LDPE polyethylene;
   3) crystalline copolymers of propylene with minor proportions of ethylene and/or other alpha-olefins, such as 1-butene, 1-hexene, 1-octene, or 4-methyl-1-pentene;
   4) heterophasic compositions comprising A) a propylene homopolymeric fraction, or one of the copolymers of point 3, and B) a copolymeric fraction formed from elastomeric copolymers of ethylene with an alpha-olefin, possibly containing minor proportions of a diene, the alpha-olefin being preferably chosen from propylene and 1-butene;
   5) elastomeric copolymers of ethylene with alpha-olefins possibly containing minor proportions of a diene.

10. Moulded articles obtained from the compositions of claim 1.

11. A self-extinguishing polymeric composition according to claim 1, wherein the polymeric composition does not contain hydroxyalkylated isocyanine-acid derivatives or homopolymers.

* * * * *